United States Patent
Yonezawa (10) Patent No.: US 7,182,300 B2
(45) Date of Patent: Feb. 27, 2007

(54) CLIP

(75) Inventor: Kenji Yonezawa, Kanagawa (JP)

(73) Assignee: Piolax Inc., Yokohama (JP)

( * ) Notice: Subject to any disclaimer, the term of this patent is extended or adjusted under 35 U.S.C. 154(b) by 0 days.

(21) Appl. No.: 10/951,030

(22) Filed: Sep. 28, 2004

(65) Prior Publication Data
US 2005/0087656 A1 Apr. 28, 2005

(30) Foreign Application Priority Data
Sep. 30, 2003 (JP) ............... P.2003-339769

(51) Int. Cl.
*F16L 3/08* (2006.01)
(52) U.S. Cl. .............. 248/74.2; 411/508; 411/511
(58) Field of Classification Search ........... 248/74.2, 248/74.1, 68.1, 222.12, 71, 73; 411/44, 500, 411/508–511, 514
See application file for complete search history.

(56) References Cited

U.S. PATENT DOCUMENTS

| | | | |
|---|---|---|---|
| 3,889,320 A * | 6/1975 | Koscik ................. | 24/297 |
| 4,312,614 A * | 1/1982 | Palmer et al. ........ | 411/44 |
| 4,489,465 A | 12/1984 | Lemkin | |
| 4,787,795 A | 11/1988 | Kraus | |
| 5,947,631 A | 9/1999 | Hironaka et al. | |
| 6,203,240 B1 * | 3/2001 | Hironaka et al. ........ | 403/397 |
| 6,371,419 B1 * | 4/2002 | Ohnuki ................. | 248/74.2 |
| 6,575,681 B2 * | 6/2003 | Kojima et al. ........ | 411/508 |
| 6,809,257 B2 * | 10/2004 | Shibuya ............... | 174/49 |
| 2004/0182973 A1 * | 9/2004 | Kawai ................. | 248/71 |

FOREIGN PATENT DOCUMENTS

| | | |
|---|---|---|
| JP | 2519211 | 9/1996 |
| JP | 2003-148265 | 5/2003 |

* cited by examiner

*Primary Examiner*—Carl D. Friedman
*Assistant Examiner*—Tan Le
(74) *Attorney, Agent, or Firm*—McGinn IP Law Group, PLLC (57) ABSTRACT

A clip which is inserted and engaged in an attaching hole includes a proximal portion for abutting against one surface around a peripheral edge of the attaching hole, a stem extending from the proximal portion and adapted to be inserted in the attaching hole, and a pair of resiliently retaining pieces extending from a distal end portion of the stem toward the proximal portion in the form of an anchor and adapted to engage an edge of the attaching hole in another surface. At least one projection is formed on a side wall of the stem opposing the resiliently retaining piece, and an amount of deflection of the resiliently retaining piece is restricted by the projection.

20 Claims, 8 Drawing Sheets

CLIP

BACKGROUND OF THE INVENTION

1. Field of the Invention

The present invention relates to a clip which is used when an attaching member such as a valve is attached to a mating member, for example, a fuel tank of an automobile or the like.

2. Description of the Related Art

Various valves such as cutoff valves and check valves are attached in and outside a fuel tank of an automobile. To attach this valve member, a clip made of a synthetic resin or the like is formed on the valve member. The valve member is conventionally attached to the mating member by causing this clip to be engaged in an attaching hole in the mating member.

Figure 13:
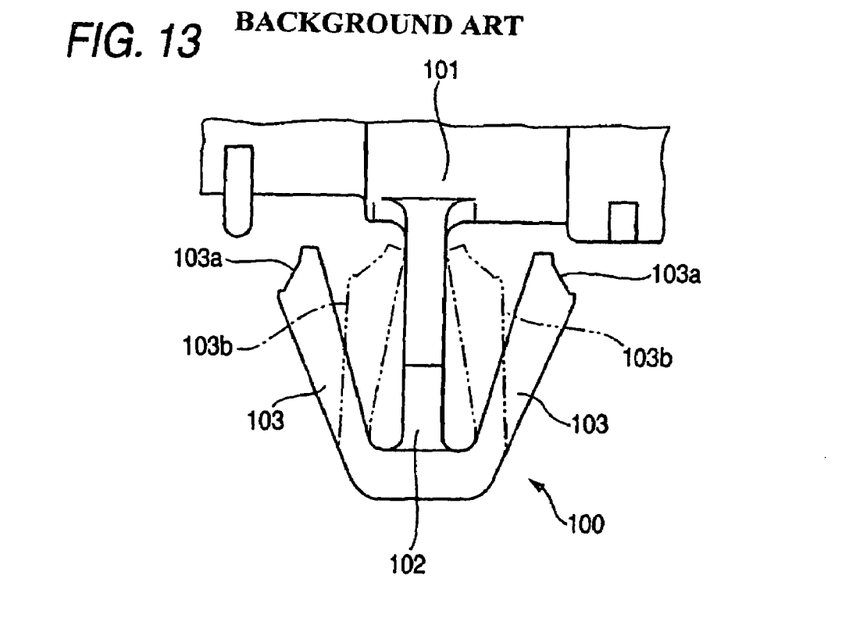
FIG. 13 is an explanatory diagram illustrating one example of a conventional clip.

As shown in FIG. 13, a conventional clip 100 has a proximal portion 101 formed on an attaching member; a stem 102 extending from this proximal portion 101; and a pair of resiliently retaining pieces 103 extending from a distal end portion of the stem 102 toward the proximal portion in the form of an anchor and adapted to engage an edge of an attaching hole.

If the resiliently retaining pieces 103 formed on this clip 100 are inserted into an inside diameter portion of the attaching hole provided in the mating member, the resiliently retaining pieces 103 undergo shrinkage in diameter and are deflected by being brought into pressure contact with the inner periphery of the attaching hole. Then, when retaining portions 103a of the resiliently retaining pieces 103 are located at the inner periphery of the attaching hole, the retaining portions 103a are engaged with the attaching hole of the mating member by virtue of the restoring force of the resiliently retaining pieces 103, thereby fixing the clip 100 to the mating member.

In addition, in Japanese Utility Model Registration No. 2,519,211 mentioned below discloses a clip whereby a sheet member, through which an insertion hole is penetrated at an appropriate position and which has cushioning properties, is fixed to a body side by means of a fixing means. This clip is included of a base disk, a column provided uprightly on the base disk substantially coaxially, and a pair of pressing pieces formed on an upper portion of the column. Further, a pair of spring pieces are formed on both side surfaces of the column below the pair of pressing pieces in such a manner as to jut out diagonally downward. The clip is fixed to the mating member by means of these members.

As a problem of the conventional clip 100 shown in FIG. 13, there is a possibility that in a case where a force is applied from the outside to the attaching hole in a radial direction, the resiliently retaining pieces 103 are deflected up to a position where they abut against the stem 102, as shown by phantom lines 103b in FIG. 13.

For this reason, the range in which the resiliently retaining pieces 103 are moved by the external force in the attached state becomes large, possibly causing rattling. In addition, in cases where the clip is formed of a resin containing a reinforcing material, if the resiliently retaining pieces are deflected to the position of the phantom lines 103b, the resiliently retaining pieces can possibly be broken.

If such a clip is used in the attachment of a valve, for instance, operation must be performed carefully so that the resiliently retaining pieces of the clip will not be broken by applying a large force thereto at the time of connecting or pulling out a tube for piping. Thus, the operating efficiency becomes extremely inferior.

On the other hand, although the clip in Japanese Utility Model Registration No. 2,519,211 is provided with the spring pieces below the pressing pieces, these spring pieces function to promote the resiliently restoring force of the pressing pieces, and they themselves are so structured as to be resiliently deflected. For this reason, the effect of alleviating rattling in the attached state is not sufficient, and it has been impossible to expect an effect of preventing breakage of the pressing pieces.

SUMMARY OF THE INVENTION

Accordingly, an object of the invention is to provide a clip which even in cases where a radial force is applied to the attaching hole, alleviates rattling and makes it possible to prevent the breakage of the resiliently retaining pieces.

To attain the above object, in accordance with a first aspect of the invention there is provided a clip which is inserted and engaged in an attaching hole including: a proximal portion for abutting against one surface around a peripheral edge of the attaching hole; a stem extending from the proximal portion and adapted to be inserted in the attaching hole; and a pair of resiliently retaining pieces extending from a distal end portion of the stem toward the proximal portion in the form of an anchor and adapted to engage an edge of the attaching hole in another surface, wherein at least one projection is formed on a side wall of the stem opposing the resiliently retaining piece, and an amount of deflection of the resiliently retaining piece is restricted by the projection.

In accordance with the above-described aspect of the invention, if the stem and the resiliently retaining pieces of the cli8p are inserted in the attaching hole, the proximal portion abuts against one surface around the peripheral edge of the attaching hole, and the resiliently retaining pieces are engaged with the edge of the attaching hole on the other surface, thereby making it possible to fix the clip.

Further, since at least one projection is formed on the stem of the clip, even if, for example, a large external force is applied to the mating member installed by this clip, the resiliently retaining pieces are deflected only up to the position where the resiliently retaining piece abuts against the projection. Accordingly, rattling is prevented, and the breakage of the resiliently retaining pieces can be prevented.

In addition, in accordance with a second aspect of the invention, in the invention according to the first aspect, the projection formed on the stem is formed at a position located closer to the proximal portion than a longitudinally intermediate portion of the resiliently retaining piece, and the height of the projection is set such that an angle of deflection of the resiliently retaining piece from a position in which no external force is applied to the resiliently retaining piece to a position where the resiliently retaining piece is about 12 degrees or less.

In accordance with the above-described aspect of the invention, since the projection is formed at a position located closer to the proximal portion than a longitudinally intermediate portion of the resiliently retaining piece, the projection reliably acts as a stopper when the resiliently retaining pieces are deflected. Since a large gap can be provided between the projection and the resiliently retaining piece even if a maximum angle of deflection is the same, molding is facilit6ated. Further, as the angle of deflection is set to the aforementioned range, it is possible to enhance the effect of preventing rattling, and reliably prevent the breakage of the resiliently retaining pieces.

Further, in accordance with a third aspect of the invention, in the invention according to the first or second aspect, the clip is formed of a resin containing a reinforcing material.

In accordance with the above-described aspect of the invention, by adding a reinforcing material such as glass fibers, it is possible to improve the mechanical properties and heat resistance of the clip. At the same time, as the amount of deflection is restricted by the projection provided on the stem, it is possible to effectively prevent the breakage of the resiliently retaining pieces.

Further, in accordance with a fourth aspect of the invention, in the invention according to any of the first to third aspects, each of the resiliently retaining pieces in a vicinity of a distal end portion thereof is bent in a chevron shape so as to approach the stem, and the projection is disposed so as to abut against a vicinity of the chevron-shaped portion.

In accordance with the above-described aspect of the invention, mold release at the time of molding is facilitated since a gap between the resiliently retaining piece and the projection can be easily secured. Further, the thickness of the distal end portion of each resiliently retaining piece can be easily obtained. Furthermore, since a force is applied to the projection from immediately above in the projecting direction when the resiliently retaining piece has abutted against the projection, the projection is unlikely to be damaged. Moreover, since the outside diameter at the time the resiliently retaining pieces are made to undergo shrinkage in diameter can be as small as possible, the insertion into the attaching hole is facilitated.

According to the invention, even if a radial force is applied to the attaching hole, the amount of deflection of the resiliently retaining pieces is restricted by the projection provided on the stem of the clip. Hence, it is possible to alleviate the rattling of the attaching member, and prevent the breakage of the resiliently retaining pieces.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Hereafter, a description will be given of an embodiment of the invention with reference to the drawings.

Figure 1:
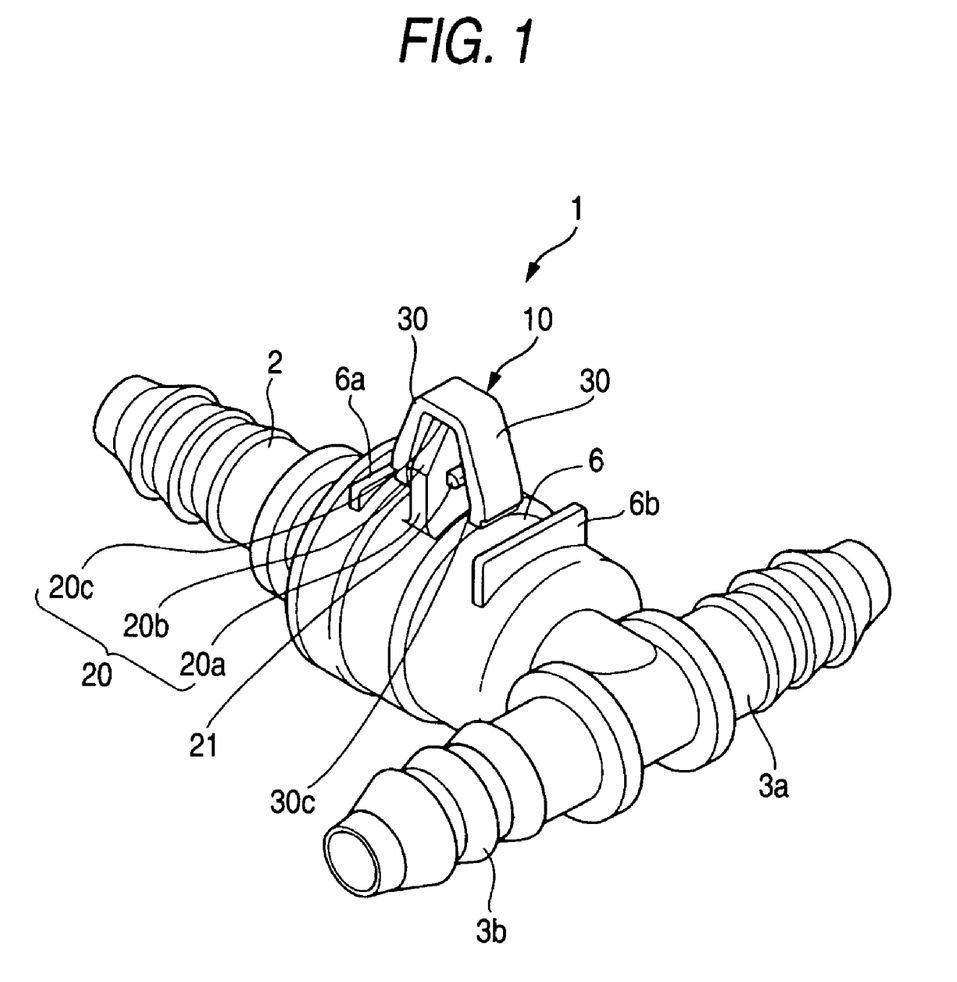
FIG. 1 is a perspective view illustrating an embodiment in which a clip of the invention is applied to a clip for attaching a check valve which is disposed in a fuel tank of an automobile.
Figure 2:
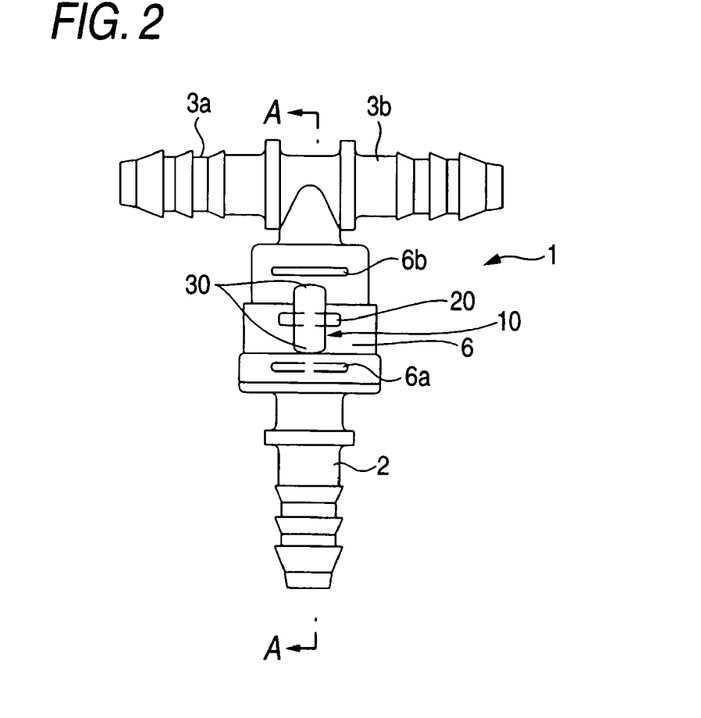
FIG. 2 is a front elevational view of the check valve.
Figure 3:
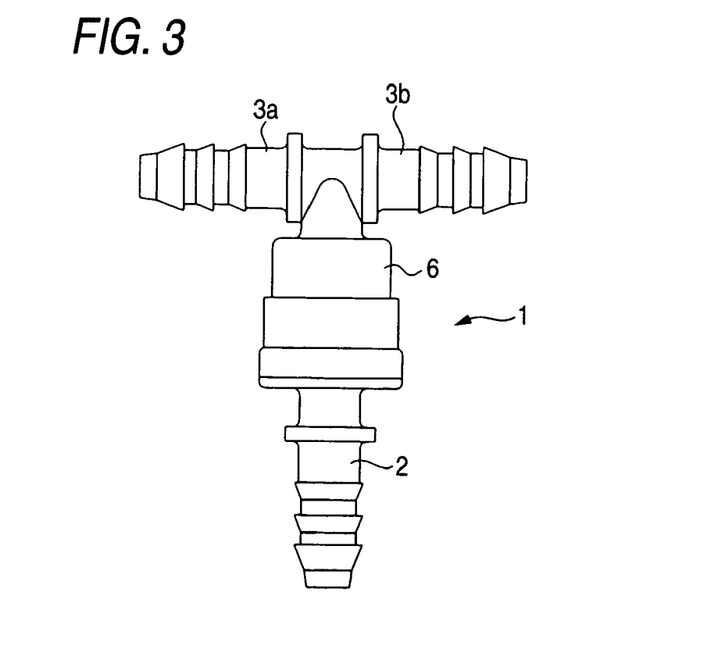
FIG. 3 is a rear view of the check valve.
Figure 4:
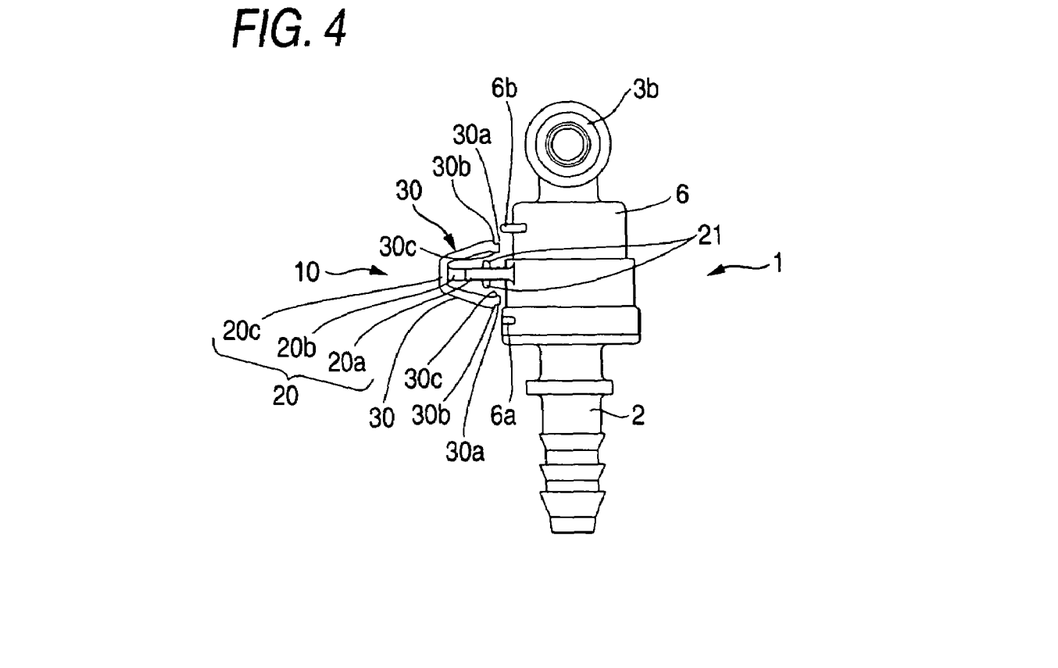
FIG. 4 is a right side elevational view of the check valve.
Figure 5:
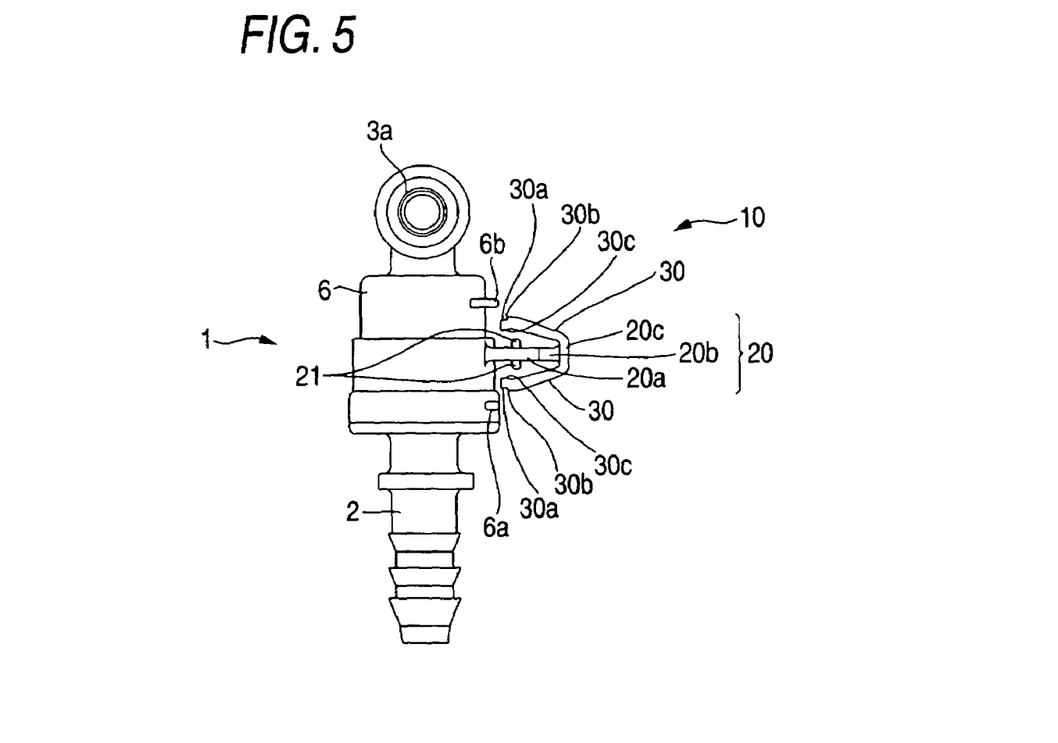
FIG. 5 is a left side elevational view of the check valve.
Figure 6:
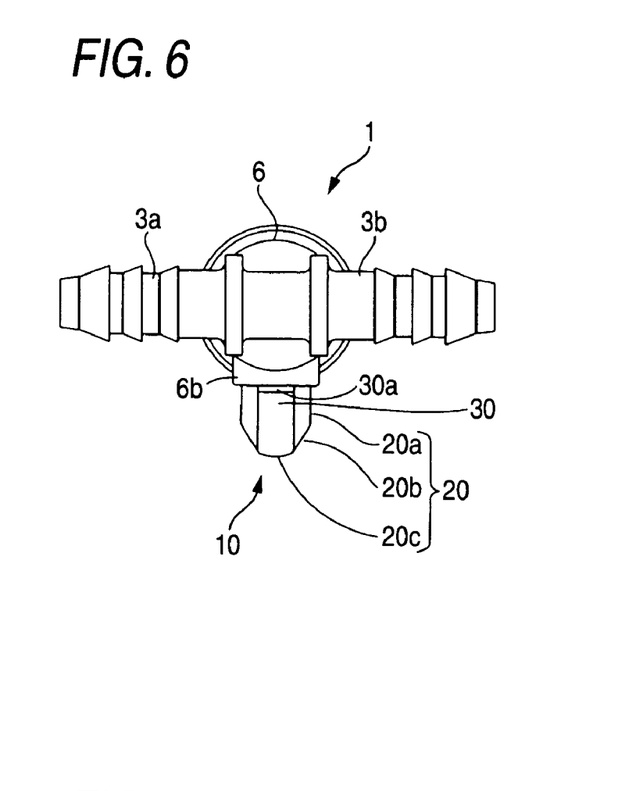
FIG. 6 is a plan view of the check valve.
Figure 7:
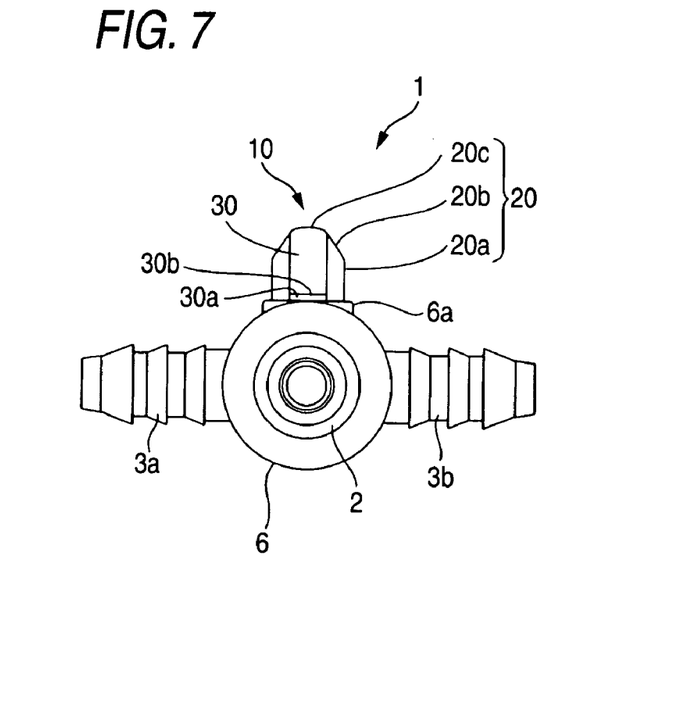
FIG. 7 is a bottom view of the check valve.
Figure 8:
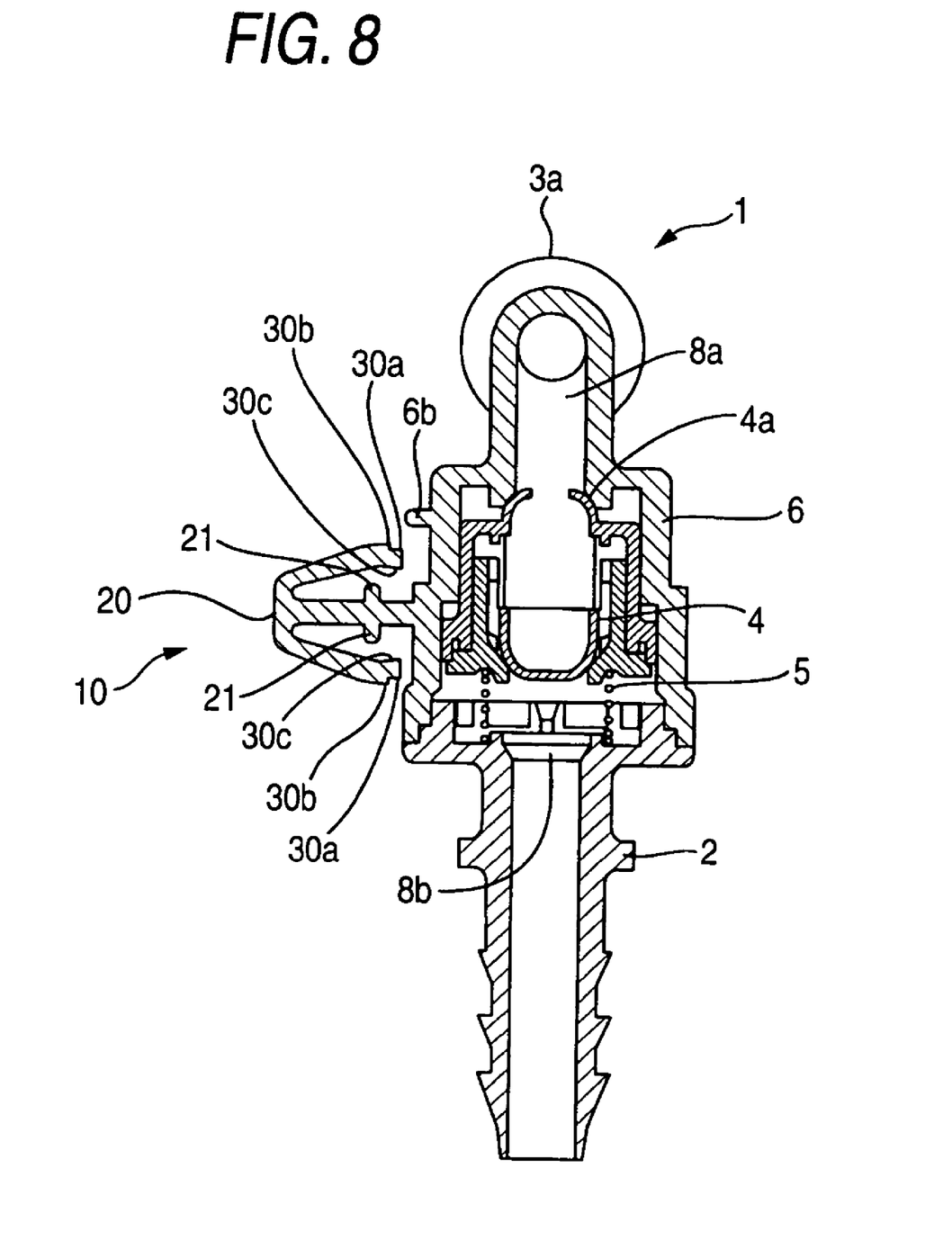
FIG. 8 is a cross-sectional view taken in the direction of arrows along line A—A in FIG. 2.
Figure 9:
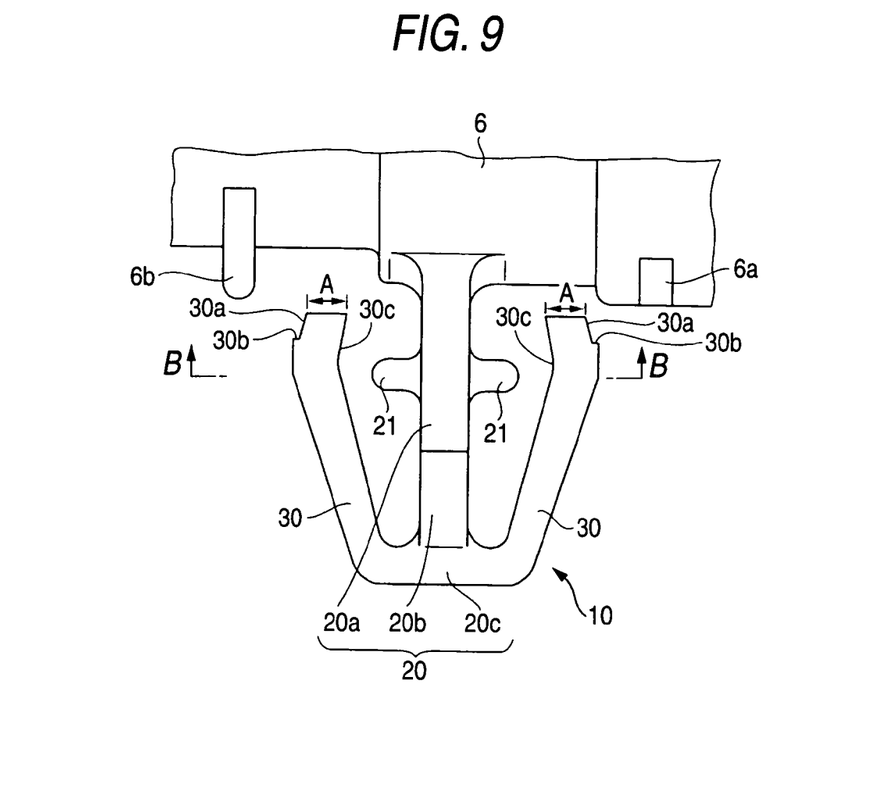
FIG. 9 is an enlarged view of a clip portion of the check valve.
Figure 10:
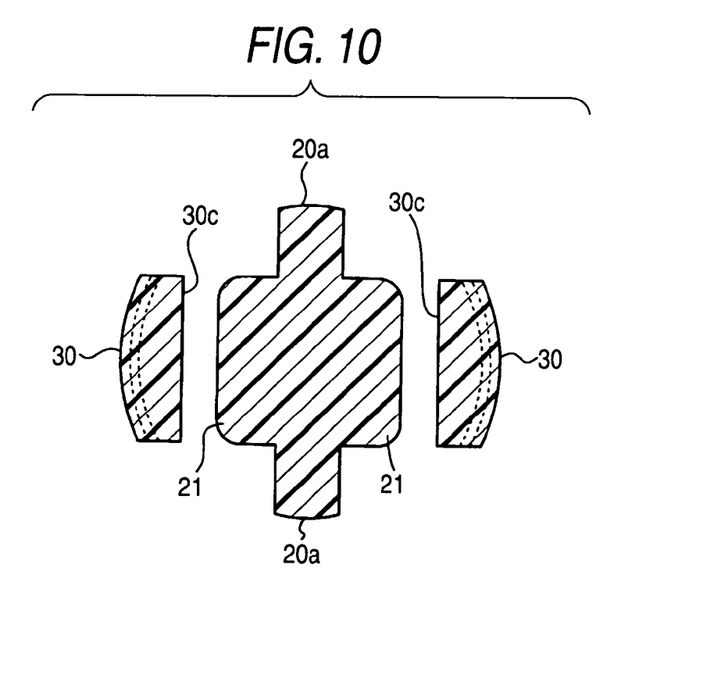
FIG. 10 is a cross-sectional view taken in the direction of arrows along line B—B in FIG. 9.
Figure 11:
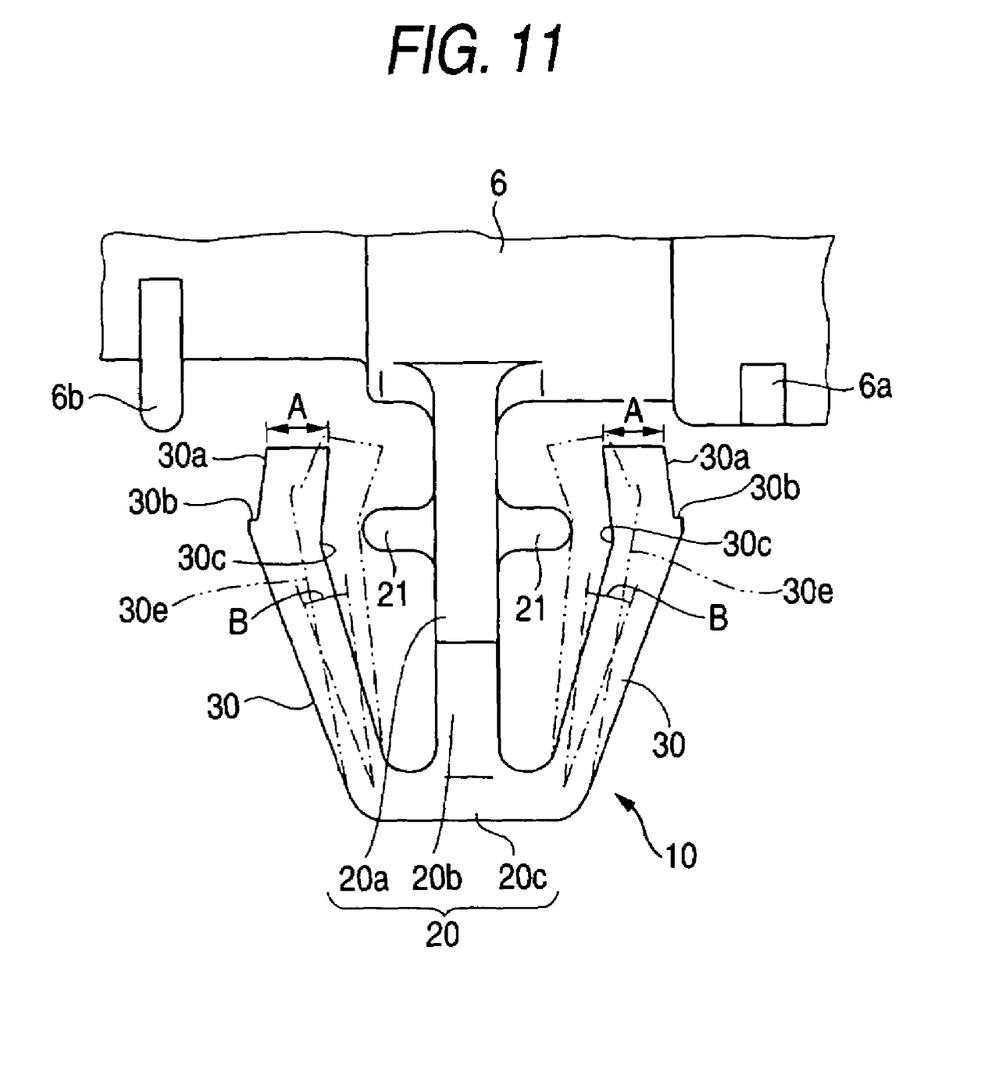
FIG. 11 is an explanatory diagram illustrating the deflecting operation of resiliently retaining pieces of the clip.
Figure 12:
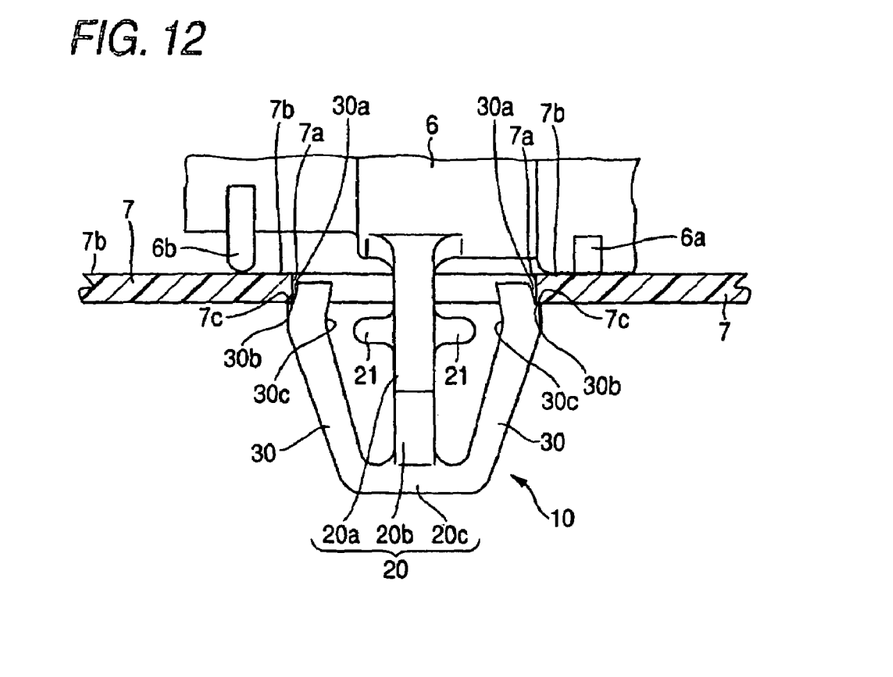
FIG. 12 is an explanatory diagram illustrating a state in which the clip is fixed to a mating member.

FIGS. 1 to 12 show an embodiment in which a clip of the invention is applied to a clip for attaching a check valve which is disposed in a fuel tank of an automobile. FIG. 1 is a perspective view of the check valve; FIG. 2 is a front elevational view of the check valve; FIG. 3 is a rear view of the check valve; FIG. 4 is a right side elevational view of the check valve; FIG. 5 is a left side elevational view of the check valve; FIG. 6 is a plan view of the check valve; FIG. 7 is a bottom view of the check valve; FIG. 8 is a cross-sectional view taken in the direction of arrows along line A—A in FIG. 2; FIG. 9 is an enlarged view of a clip portion; FIG. 10 is a cross-sectional view taken in the direction of arrows along line B—B in FIG. 9; FIG. 11 is an explanatory diagram illustrating the deflecting operation of resiliently retaining pieces of the clip; and FIG. 12 is an explanatory diagram illustrating a state in which the clip is fixed to a mating member.

This check valve 1 is installed in a fuel tank for an automobile, and is used to connect the unillustrated fuel vapor piping to the piping communicating with a canister disposed outside the fuel tank. The check valve 1 functions to cause the fuel vapor to escape to the canister as the valve is opened when fuel vapor pressure within the fuel tank has become higher than a predetermined value.

As shown in FIGS. 1 to 7, this check valve 1 has a substantially hollow cylindrical valve case 6, two nipples 3a and 3b opposing each other and connected to one end of this valve case 6 in a T-shape, and a nipple 2 connected coaxially to the other end of the valve case 6. Further, a fuel-vapor introducing pipe disposed in the fuel tank is connected to the nipples 3a and 3b. A fuel-vapor exhaust pipe for removing the fuel vapor outside the tank and delivering it to the unillustrated canister is connected to the nipple 2.

As shown in FIG. 8, a valve chamber 8, with which the nipples 3a and 3b to which the fuel-vapor introducing pipe is connected and the nipple 2 to which the fuel-vapor exhaust pipe is connected communicate, is provided in the valve case 6. Further, the nipples 3a and 3b communicate with the valve chamber 8 through an inlet port 8a, while the nipple 2 communicates with the valve chamber 8 through an outlet port 8b. A valve element 4 is slidably disposed in this valve chamber 8 in such a manner as to cause its head 4a to open or close with respect to the inlet port 8a. The valve element 4 is urged by a spring 5 so as to cause its head 4a to close the inlet port 8a. It should be noted that, although not shown, radial ribs are formed on an outer periphery of the valve element 4. The arrangement provided is such that when the valve element 4 has slid and its head 4a has moved away from the inlet port 8a, the fuel vapor which flowed in through the inlet port 8a can pass around the outer periphery of the valve element 4 and flow to the outlet port 8b.

Accordingly, when the fuel vapor pressure within the unillustrated fuel tank exceeds a predetermined value, the valve element 4 slides against the spring 5 to open the inlet port 8a, so that the fuel vapor which was introduced through the nipples 3a and 3b flows into the valve chamber 8. This fuel vapor passes through a gap around the outer periphery of the valve element 4, and flows out from the outlet port 8b to the nipple 2. The fuel vapor then passes through the unillustrated piping connected to the nipple 2 and is led outside the fuel tank, so as to be delivered to the canister installed outside the fuel tank.

As shown in FIGS. 9 to 12, a clip 10 is integrally formed on an outer wall of the valve case 6. This clip 10 is included of a stem 20 extending from a wall portion (constituting a proximal portion in the invention) of the valve case 6; a pair of resiliently retaining pieces 30 extending from a distal end of the stem 20 toward the valve case 6 in the form of an anchor; and a pair of projections 21 formed respectively on both side walls of the stem 20 opposing the resiliently retaining pieces 30. A mating member 7 in the case of this embodiment is, for instance, a bracket disposed in advance in the fuel tank, and has an attaching hole 7a for fitting the clip 10.

A pair of pressing portions 6a and 6b for abutting against one surface 7b of the mating member 7 are formed on the wall portion of the valve case 6 in the form of mutually parallel ribs. In the state in which the pressing portions 6a and 6b abut against the one surface 7b of the mating member 7, the stem 20 is disposed substantially perpendicularly to an attaching surface of the mating member 7.

As shown in FIGS. 1 and 7, the stem 20 has a plate shape as a whole, and has a plate-like portion 20a having a width for fitting to the inside diameter of the attaching hole 7a, a tapered portion 20b in which the distance between both sides is gradually reduced, and a distal end portion 20c of this tapered portion 20b. In addition, as shown in FIG. 10, both sides of the plate-like member 20a are each formed in an arcuate shape having an outside diameter slightly smaller than the inside diameter of the attaching hole 7a, and are formed such that the plate-like member 20a can be inserted in a state of being fitted to the inner periphery of the attaching hole 7a. Further, FIG. 10 very clearly illustrates that the width of the resiliently retaining pieces 30 is substantially the same as the width of the projections 21.

The pair of resiliently retaining pieces 30 extend from the distal end portion 20c of the stem 20 toward the valve case 6 in the form of an anchor. In the case of this embodiment, the resiliently retaining pieces 30 are respectively formed such their distal end portions are bent in a chevron shape. Further, as or the resiliently retaining pieces 30, there is a fixed limit to their outside diameter since it is necessary for them to have an outside diameter which enables them to pass through the attaching hole 7a when they are inwardly deflected. However, as the distal end portions are bent in a chevron shape as described above, the thickness A of each distal end portion can be made relatively large.

Further, a stepped portion 30b for engaging an edge 7a of the attaching hole 7a in the other surface is formed on an outer side of each distal end portion bent in the chevron shape mentioned above. In addition, an outer side of the distal end portion of the resiliently retaining piece 30 closer to its distal end than the stepped portion 30b is formed as an abutment portion 30a which is brought into resilient pressure contact with the inner periphery of the attaching hole 7a.

The pair of projections 21 are respectively formed on left and right wall portions of the stem 20 in such a manner as to oppose inner portions 30c which are the bent, chevron-shaped portions of the pair of resiliently retaining pieces 30. When the resiliently retaining pieces 30 are deflected inwardly, these projections 21 abut against the inner portions 30c bent in the chevron shape and act to restrict the amount of their deflection.

Then, as the resiliently retaining pieces 30 are bent in the chevron shape, it becomes possible to provide as wide a gap as possible between the projection 21 and the inner portion 30c of the resiliently retaining piece 30 while maintaining the outside diameter of the resiliently retaining pieces 30 within a limited range. Therefore, mold release at the time of molding is facilitated.

In addition, if the resiliently retaining pieces 30 are deflected to a maximum limit, the resiliently retaining pieces 30 assume a shape shown by phantom lines 30e shown in FIG. 11. At this juncture, since the bent, chevron-shaped inner portions 30c of the resiliently retaining pieces 30 abut against tips of the projections 21 in such a manner as to press down immediately from above, a bending stress is not applied to the projections 21, so that the projections 21 are unlikely to break.

It should be noted that an angle B formed between the resiliently retaining piece 30 in a state in which an external force is not applied thereto and the resiliently retaining piece 30 in a state in which the resiliently retaining piece 30 is deflected until it abuts against the projection 21 is preferably 12 degrees or less, more preferably 9 to 11 degrees. This makes it possible to enhance the effect of preventing the breakage of the resiliently retaining pieces 30.

As a material of the clip 10, one which has excellent moldability and excels in solvent resistance. For example, a resin material such as polyethylene, polypropylene, polyacetal, polybutylene terephthalate, or the like is used.

In addition, in the case of this embodiment, the clip 10 is integrally molded with the valve case 6 of the check valve 1. In a case where the check valve 1 is installed inside a metallic fuel tank, after the check valve 1 is installed in advance in the fuel tank and is joined to the fuel tank, baking finish is provided. For this reason, the check valve 1 and the clip 10 are required to be formed of a material capable of withstanding high temperatures at the time of baking finish. As such a material, a resin in which a reinforcing material such as glass fibers or carbon fibers is added to a heat resistant resin such as polyamide, polybutylene terephthalate (PBT), or polyphenylene sulfide (PPS) is suitably used. Although such a resin is characterized in that it is relatively hard, has high strength, and is highly heat resistant, it has a drawback that it becomes brittle.

However, in the invention, since the maximum angle of deflection of the resiliently retaining pieces 30 is restricted by the projections 21 formed on the stem 20, even if the resiliently retaining pieces 30 are subjected to a strong force and are deflected to a maximum limit, the breakage can be prevented.

FIG. 12 shows a state in which the above-described check valve 1 is attached to the mating member 7 constituted by a bracket provided on an inner wall of the fuel tank by means of the clip 10.

To describe this attaching procedure, the distal end portion 20c of the stem 20 of the clip 10 is inserted into the attaching hole 7a of the mating member 7 from the one surface 7b side around the attaching hole 7a. The resiliently retaining pieces 30 undergo shrinkage in diameter along the inside diameter of the attaching hole 7a. The clip 10 is further pressed in, and when the stepped portions 30b of the resiliently retaining pieces 30 come out to the opposite side of the attaching hole 7a, the stepped portions 30b are engaged with the hole edge 7c on the opposite surface, and the abutment portions 30a are brought into pressure contact with the inner periphery of the attaching hole 7a. Consequently, the mating member 7 is integrated with the clip 10 by being clamped by the pressing portions 6a and 6b abutting against the one surface 7b at the peripheral edge of the attaching hole 7a and by the stepped portions 30b abutting against the hole edge 7c on the other surface. Thus, the clip 10 and the valve case 6 are fixed to the mating member 7.

In this state, when a strong force is applied to the clip 10 in the radial direction of the attaching hole 7a, the resiliently retaining pieces 30 are deflected, and the clip 10 tends to be offset from the mating member. However, since the resiliently retaining pieces 30 abut against the projections 21 of the stem 20, the amount of deflection of the resiliently retaining pieces 30 is restricted, and the movement of the clip 10 is minimized. Hence, it is possible to alleviate the rattling of the clip 10 with respect to the mating member 7. In addition, even in a case where the clip 10 is formed of a material which lacks resiliency as in the case of a resin containing a reinforcing material, it is possible to prevent the breakage of the resiliently retaining pieces 30 by restricting the amount of their deflection.

It should be noted that although, in the above-described embodiment, the clip 10 is formed integrally with the check valve 1 which is an attaching member, the invention is applicable to any clip which includes: a proximal portion for abutting against one surface around a peripheral edge of the attaching hole; a stem extending from the proximal portion and adapted to be inserted in the attaching hole; and a pair of resiliently retaining pieces extending from a distal end portion of the stem toward the proximal portion in the form of an anchor and adapted to engage an edge of the attaching hole in another surface.

The clip in accordance with the invention is applicable to such as a clip which is inserted in attaching holes of a pair of superposed members to fix the pair of members, and to a clip which is molded integrally with an attaching member or secured in advance to an attaching member, and which makes it possible to fix the attaching member by being merely inserted in the attaching hole of a mating member. In particular, the clip in accordance with the invention is suitably used as a clip formed of a reinforcing-member containing resin which is likely to break when it is deflected.

What is claimed is:

1. A clip which is inserted and engaged in an attaching hole comprising:
   a proximal portion for abutting against one surface around a peripheral edge of the attaching hole;
   a stem extending from the proximal portion and adapted to be inserted in the attaching hole; and
   a pair of resiliently retaining pieces extending from a distal end portion of the stem toward the proximal portion in a form of an anchor and adapted to engage an edge of the attaching hole in another surface opposing said one surface,
   wherein at least one projection is formed on a side wall of the stem opposing the resiliently retaining piece, and an amount of deflection of the resiliently retaining piece is restricted by the projection, and
   wherein a width of said resiliently retaining piece is substantially the same as a width of the at least one projection.

2. The clip according to claim 1, wherein the projection formed on the stem is formed at a position located closer to the proximal portion than a longitudinally intermediate portion of the resiliently retaining piece, and a height of the projection is set such that an angle of deflection of the resiliently retaining piece from a state in which no external force is applied to the resiliently retaining piece to a state where the resiliently retaining piece contacts said projection is about 12 degrees or less.

3. The clip according to claim 1, wherein the clip is formed of a resin containing a reinforcing material.

4. The clip according to claim 1, wherein each of the resiliently retaining pieces in a vicinity of a distal end portion thereof is bent in a chevron shape so as to approach the stem, and the projection is disposed so as to abut against a vicinity of the chevron-shaped portion.

5. The clip of claim 1, wherein at least one of said pair of resiliently retaining pieces comprises a stepped portion at a distal end for engaging an edge of said another surface and said attaching hole.

6. The clip of claim 1, wherein at least one of said pair of resiliently retaining pieces comprises an abutment portion at a distal end for abutting an inner periphery of said attaching hole.

7. The clip of claim 1, wherein said proximal portion comprises a pair of pressing portions for abutting against said one surface.

8. The clip of claim 7, wherein at least one of said pair of pressing portions comprises a rib on said proximal portion.

9. The clip of claim 7, wherein said pair of pressing portions comprises a pair of mutually parallel ribs.

10. The clip of claim 1, wherein said stem comprises a plate-like portion.

11. The clip of claim 10, wherein said plate-like portion comprises a tapered portion at a distal end.

12. The clip of claim 10, wherein said plate-like portion comprises arcuate-shaped sides.

13. The clip of claim 1, wherein said proximal portion comprises a valve case for a check valve and wherein said proximal portion comprises a wall portion of said valve case.

14. The clip of claim 1, wherein a thickness of a distal end portion of at least one of said pair of resiliently retaining pieces is about the same as or larger than a thickness of the proximal end portion of said at least one of said pair of resiliently retaining pieces.

15. The clip of claim 2, wherein said angle of deflection is between about 9 degrees and about 11 degrees.

16. A clip comprising:
   a proximal portion for abutting against one surface of a mating member;
   a stem extending from said proximal portion;
   a pair of resilient retainers extending from a distal end of said stem toward said proximal portion for abutting against another surface of said mating member opposing said one surface; and
   at least one projection extending from a side of said stem toward at least one of said pair of resilient retainers,
   wherein a width of said at least one of said pair of resilient retainers is substantially the same as a width of said at least one projection.

17. The clip of claim 16, wherein a height of said at least one projection limits an angle of deflection of at least one of said pair of resilient retainers between a position where said at least one of said pair of resilient retainers contacts said at least one projection to a position of said at least one of said pair of resilient retainers is unstrained.

18. The clip of claim 16, wherein said at least one projection is closer to said proximal portion than a logitudinally intermediate portion of said stem.

19. The clip of claim 16, wherein said clip comprises a resin and a reinforcing material.

20. The clip of claim 16, wherein at least one of said pair of resilient retainers forms a chevron shape.

* * * * *